(12) United States Patent
Young

(10) Patent No.: US 6,357,667 B1
(45) Date of Patent: Mar. 19, 2002

(54) METHOD AND APPARATUS OPTICALLY COUPLING THERMOSTAT TO CONTROL A FAN

(75) Inventor: Glen Chester Young, Ft. Wayne, IN (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/630,501

(22) Filed: Aug. 2, 2000

(51) Int. Cl.[7] .............................. F24F 7/00; G05D 15/00
(52) U.S. Cl. ........................................ 236/49.3; 236/68 B
(58) Field of Search .............................. 236/68 B, 49.3, 236/11; 454/229

(56) References Cited

U.S. PATENT DOCUMENTS 4,328,528 A  *  5/1982  Kompelien ............ 236/68 B X
5,655,709 A  *  8/1997  Garnett et al. ............ 236/68 B

* cited by examiner

Primary Examiner—William Wayner
(74) Attorney, Agent, or Firm—Damian Wasserbauer, Esq.; Armstrong Teasdale LLP

(57) ABSTRACT

An electrical circuit for controlling the activation of a fan includes optically coupled isolators. The circuit is electrically connected in series to a thermostat including a bimetal actuated contact with an anticipator across the contact. Power to the circuit is provided by voltage developed across the system relay coil in series with the thermostat. A zener diode establishes a threshold voltage consistent with the operation of the system relay coil and the thermostat. The optically coupled isolators provide the required electrical isolation needed to protect the thermostat from a power control circuit of an electronically controlled fan.

34 Claims, 2 Drawing Sheets

METHOD AND APPARATUS OPTICALLY COUPLING THERMOSTAT TO CONTROL A FAN

BACKGROUND OF THE INVENTION

This invention relates generally to thermostats, and more particularly to controlling a fan with a thermostat.

Known thermostats employ a resistive element to reduce or prevent overshooting a temperature setting. The resistive element is typically referred to as an anticipator. Thermostats without anticipators sense a temperature one or two degrees above a temperature setting and then open a switch contact. For instance, in an unanticipated thermostat set for turning on a furnace, the switch contact will remain closed so the furnace continues to run until the temperature rises one or two degrees above a temperature set point. The temperature rise above the temperature setting is caused by the delay in heating the thermal mass of a bimetal heat sensing element, located in the thermostat, above the set point temperature, and this excess temperature rise is known as overshoot. When the temperature rises above the temperature set point, the switch contacts open turning the furnace off. Then as the room temperature decreases, the temperature has to drop one or two degrees below the temperature set point before the switch contacts are closed to turn on the furnace. This temperature drop below the temperature set point is known as undershoot. Typically the anticipator functions to minimize undershooting and overshooting the thermostat's temperature set point.

The anticipator "anticipates" when the room temperature approaches the temperature set point of the thermostat. An anticipator is a resistive heating element. When a thermostat is turned "on" for heating, a current is applied to the anticipator. The current flow through the anticipator heats the anticipator which is electrically connected to a bimetal switch. The bimetal switch deflects with temperature changes to open or close the contacts. When the room temperature decreases below the thermostat set point, the bimetal switch contracts and closes the contacts turning on the furnace. The anticipator "heats" the bimetal switch to sense a higher temperature within the thermostat compared to the room temperature. By adding internal heat, the anticipator reduces the amount of room temperature differential required to turn off the furnace.

However, in such a system employing an anticipator, the connection of the anticipator across the contacts of the thermostat does not allow the voltage across controlled elements, such as a relay coil, to go to zero during the off state. Instead, a finite voltage remains across the relay coil when the thermostat is in the off state. Lower resistance of the relay coil compared to the anticipator, results in a lower voltage across the relay coil. In known systems, the relay coil applies electrical power to a heating or cooling system. However when the thermostat is in the off state, there exists a finite voltage across the relay coil less than an amount of voltage required to energize and close the relay coil. It would be desirable to coordinate the finite voltage across the relay coil to that voltage required for the activation of a variable speed fan. If would be further desirable for an electronic circuit to provide an interface to electrically couple the different operating voltage requirements between a relay coil and the variable speed fan.

BRIEF SUMMARY OF THE INVENTION

In an exemplary embodiment, an electric circuit is connected in series to a thermostat including a bimetal actuated contact with an anticipator across the contact. The electrical circuit including a pair of optically coupled isolators to allow a variety of input control options. The options include the selection of different air flow rates. Either of the pair of optically coupled isolators maybe connected to the thermostat. Power to the electric circuit is provided by voltage developed across the system relay coil in series with the thermostat, e.g., current flows from a system control transformer though the thermostat contacts and through the relay coil. The voltage generated across the relay coil is used to power the electric circuit to electronically control a fan.

The electrical circuit includes in one embodiment, a first input terminal and a second input terminal, which are connected to one optically coupled isolator. Connected in series to both the first and the second input terminals is a first zener diode that establishes a threshold voltage consistent with the operation of the system relay coil and the thermostat. In addition, a second zener diode connected in series to the first input terminal rectifies the AC voltage to a half-wave rectified voltage. Connected to the second input terminal is a fall-wave bridge rectifier that rectifies an AC voltage to a DC voltage. A purpose of the first zener diode in series with the first terminal is to generate a half-wave rectified voltage for the optically coupled isolator to differentiate the input voltage from the first input terminal from the input voltage from the second input terminal. In addition, the first zener diode in series with the first terminal protects the electrical circuit from transient voltages, e.g., electrostatic discharge voltage. In addition, the optically coupled isolators provide the electrical isolation to protect the thermostat, including a ground reference control circuit, from high voltage circuits that provide power to the electronically driven fan.

More particularly, the fan control is electrically connected to an electrically erasable programmable read-only memory (EEPROM), which is programmed to control a plurality of fan modes based on combinations of inputs from the thermostat. As a result, a cost-effective and reliable electrical circuit including optically coupled isolators to control fan activation is provided .

DETAILED DESCRIPTION OF THE INVENTION

Figure 1:
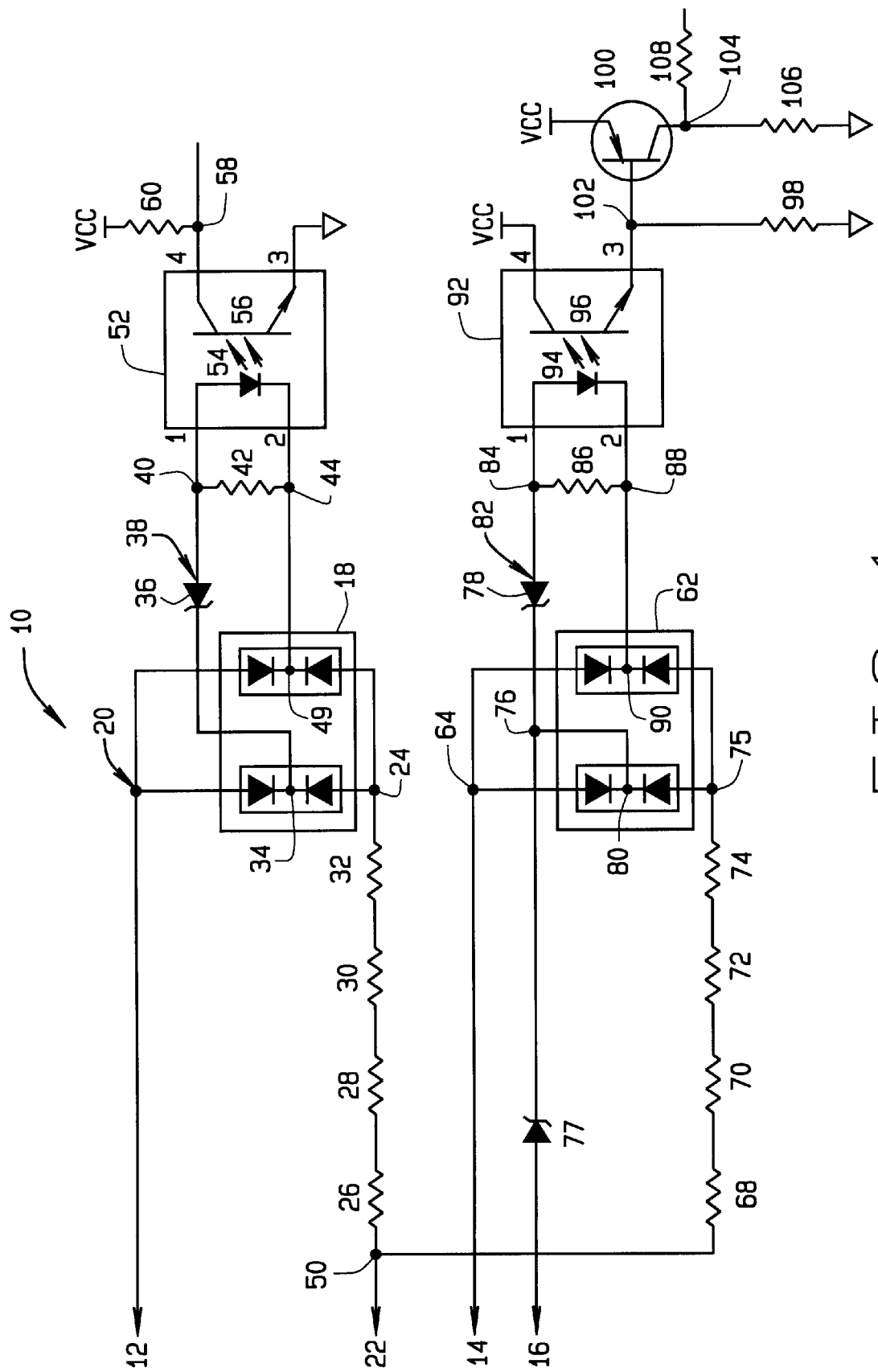
FIG. 1 is a schematic illustration of an exemplary embodiment of the invention.

FIG. 1 is a schematic illustration of an exemplary embodiment of an electrical circuit 10. Electrical circuit 10 includes input terminals 12, 14, and 16, and return line 22. Connected to input terminal 12 at node 20 is full-wave bridge rectifier 18. Full-wave bridge rectifier 18 is connected at node 24 to resistors 26, 28, 30, and 32 that are connected in series and connected to return line 22 at node 50. At node 34, full-wave bridge rectifier 18 is connected to zener diode 36. Zener diode 36 is connected to node 40 by its anode 38. Zener diode 36 is connected to shunt resistor 42 at node 40. In addition, Shunt resistor 42 is provided current from fall-wave bridge rectifier 18 at nodes 40 and 44. Node 44 and node 49 share a common line. Full-wave bridge rectifier 18 is connected to node 49 and therefore connected to shunt resistor 42 at node 44. In addition, optically coupled isolator 52 is connected in parallel to shunt resistor 42 at nodes 40 and 44. The output of optically coupled isolator 52 is connected to node 58. Load resistor 60 is connected to node 58.

Input terminal 14 is connected to full-wave bridge rectifier 62 at node 64. Full-wave bridge rectifier 62 is connected to resistors 68, 70, 72, and 74 that are connected in series at node 75. Node 76 connects full-wave bridge rectifier 62 to zener diodes 77 and 78. Zener diode 77 and zener diode 78 are configured so their cathodes face each other. The anode of zener diode 77 is connected to input line 16, while the anode of zener diode 78 is connected to node 84. Shunt resistor 86 is connected between nodes 84 and 88. In addition, Shunt resistor 86 is provided current from fall-wave bridge rectifier 62 at nodes 84 and 88. Node 88 and node 90 share a common line. Full-wave bridge rectifier 62 is connected to node 90 and therefore connected to shunt resistor 86 at node 88. In addition, optically coupled isolator 92 is connected in parallel to shunt resistor 86 at nodes 84 and 88. The output-of optically coupled isolator 92 is connected to node 102. Node 102 connects optically coupled isolator 92 and resistor 98 to transistor 100. Connected to the output of transistor 100 at node 104 is a network comprising resistor 106 and resistor 108. In one embodiment, resistor 108 is connected to memory (not shown).

In an exemplary embodiment, input terminal 12 and return line 22 are electrically connected in parallel to a relay coil (not shown) controlled by a thermostat (not shown). In one embodiment, to control operation of a fan, a thermostat including a set of contacts (not shown) are electrically connected to an anticipator _(not shown), and the contacts are connected to input terminal 14 and return line 22. In an alternative embodiment, a system control relay (not shown) is connected to input terminal 14 and return line 22, and provides 24 VAC to input terminal 14. In a further alternative embodiment, the system control relay is connected to input terminal 16 and return line- 22, and provides 24 VAC td input terminal 16. In a still further embodiment, one termination of a secondary winding of a transformer (not shown) is connected to input terminal 14 through the thermostat contacts, and the second termination of said secondary winding is connected to return line 22 to compete the electric circuit. In another embodiment, one termination of a secondary winding of the transformer is connected to input terminal 16 through the thermostat contacts, and the second termination of the secondary winding of the transformer is connected to return line 22 to compete the electric circuit.

Current flows through both the anticipator and the relay coil, fan speed is controlled through a microcomputer (not shown). Electrical power is provided to electrical circuit 10 by the relay coil connected in parallel though input terminal 12. In one embodiment, the voltage signal input to terminal 12 is 24VAC. Input terminal 12 is electrically connected to full-wave bridge rectifier 18 at node 20. Furthermore, full-wave bridge rectifier 18 is connected to return line 22 through a plurality of resistors 26, 28, 30, and 32 connected to node 24. In one embodiment, resistors 26, 28, 30, and 32 are surface mount resistors. The AC voltage at input terminal 12 is applied through node 20 to full-wave bridge rectifier 18, where it is rectified to a DC voltage.

The DC voltage generated by full-wave bridge rectifier 18 is limited at node 34 by zener diode 36 and the input of LED 54 included in optically coupled isolator 52. Zener diode 36 blocks current to the input of optically coupled isolator 52 and resistor 42 when the input voltage at input terminal 12 is below the operating voltage of zener diode 36. In order for current to flow through LED 54 of optically coupled isolator 52, an absolute voltage, positive or negative voltage, at input terminal 22 and return 22 must exceed the voltage required to activate fall-wave bridge rectifier 18 and zener diode 36. As the voltage increases the current increases such that optically coupled isolator 52 is activated. Resistor 42 serves to decrease any current presented to optically coupled isolator 52. In addition, resistor 42 assists to provide a predictable input operating voltage threshold for optically coupled isolator 52. In another embodiment, electrical circuit 10 does not include resistor 42. In one embodiment, optically coupled isolator 52 is a PC367NT manufactured by SHARP Microelectronics of the Americas, Camas, Wash. 98607.

Optically coupled isolator 52 is electrically connected in parallel to resistor 42 at nodes 40 and 44. Optically coupled isolator 52 includes a light emitting diode (LED) 54 and a transistor 56. In a preferred embodiment, optically coupled isolator 52 is activated when the voltage across LED 54 is at least 1.2 volts and the forward current through LED 54 is at least 0.5 mA. When LED 54 is activated, an optical signal is transmitted to transistor 56. The optical signal generates a current in the base of transistor 56 which biases transistor 56 so it is turned on. When transistor 56 is on, current flows from the collector. In one embodiment, if the forward current through LED 42 is 0.5 mA, the resulting collector current produced in transistor 56 will be 2.5 mA when the voltage across the collector-to-emitter is 5V.

In one embodiment, the signal at node 58 is inverted with respect to the signal input to transistor 56. The output of the signal from transistor 56 is taken from its collector at node 58. Connected to node 58 is resistor 60, which serves to pull-up the voltage at node 58 to a value approximately at Vcc when transistor 56 is turned off. As the voltage increases at input terminal 12 and return line 22, the current increases to LED 54 and turns on transistor 56. When transistor 56 is turned on, the voltage at node 58 decreases. Resistor 60 also serves to determine a threshold operating voltage at the input to optically coupled isolator 52 and to set the response time of transistor 56. In one embodiment, resistor 60 has a value of 15,000 ohms. This embodiment does not require a fast response time as the input is limited to a line frequency approximately between 50–60 Hz. However, as the value of resistor 60 increases, the turn off response time of transistor 56 increases. A microcomputer (not shown) is connected to node 58.

The output signal at node 58 is then transmitted to the microcomputer which determines fan activation. The term microcomputer, as used herein, refers to microprocessors, microcontrollers, CPUs, reduced instruction set circuits (RISC), application specific integrated circuits (ASICs), logic circuits, and any other circuit or processor capable of executing a series of instructions or software programs.

The second portion of electrical circuit 10 is connected at node 50. The second portion of electrical circuit 10 has input terminal 14 and input terminal 16 as inputs. As mentioned above, a secondary winding of a transformer (not shown) is connected to input terminal 14 through the thermostat contacts. In another embodiment, the secondary winding of the transformer is connected to input terminal 14 through other controlling contacts. The alternate termination of the secondary winding of the transformer is connected to return line 22 to compete the electric circuit. In an alternative embodiment, the transformer (not shown) is connected to input terminal 16 to produce an alternate control operation. In a further alternative embodiment, the transformer is connected to both input terminal 14 and input terminal 16, where terminal 14 overrides the connection to terminal 16. The transformer provides a 24 AC voltage to the input of terminal 14. Full-wave bridge rectifier 62 is electrically connected to input terminal 14 at node 64. Furthermore, full-wave bridge rectifier 62 is connected to return line 22 at node 67. Further connected between node 67 and node 50 is a plurality of resistors 68, 70, 72, and 74. In one embodiment, resistors 68, 70, 72, and 74 are surface mount resistors. The 24AC signal is transmitted to fall-wave bridge rectifier 62, where it is rectified to produce a DC voltage.

The DC voltage generated by full-wave bridge rectifier 62 is limited at node 76 by zener diode 78 and the input of LED 94 included in optically coupled isolator 92. Zener diode 78 blocks current to the input of optically coupled isolator 92 and resistor 86 when the input voltage across input terminals 14 and 16 and return line 22 is below the operating voltage of zener diode 78. In one embodiment, in order for current to flow through LED 94 of optically coupled isolator 92, absolute voltage, positive or negative voltage, at input terminal 14 and return 22 must exceed the voltage required to activate full-wave bridge rectifier 62 and zener diode 78. In another embodiment, when input terminal 16 is connected, the absolute voltage at input terminal 16 and return 22 must exceed the voltage required to activate full-wave bridge rectifier 62 and zener diode 78. As the voltage increases the current increases such that optically coupled isolator 92 is activated. Resistor 86 serves to decrease any current presented to optically coupled isolator 92. In addition, resistor 86 assists to provide a predictable input operating voltage threshold for optically coupled isolator 92. In another embodiment, electrical circuit 10 does not include resistor 86. In one embodiment, optically coupled isolator 92 is a PC367NT manufactured by SHARP Microelectronics of the Americas, Camas, Wash. 98607.

Optically coupled isolator 92 is electrically connected in parallel to resistor 86 at nodes 84 and 88. Optically coupled isolator 92 includes a light emitting diode (LED) 94 and transistor 96. In a preferred embodiment, optically coupled isolator 92 is activated when the voltage across LED 84 is at least 1.2 volts and the forward current through LED 94 is at least 0.5mA. When LED 94 is activated, an optical signal is transmitted to transistor 96. The optical signal generates a current in the base of transistor 96 which biases transistor 96 so it is turned on. When transistor 96 is on, current flows from the collector. In one embodiment, if the forward current through LED 94 is 0.5mA, the resulting collector current produced in transistor 96 will be 2.5 mA when the voltage across the collector-to-emitter is 5V.

Optical coupled isolator 92 is electrically connected to resistor 98 and transistor 100 at node 102. In one embodiment, resistor 98 biases the base of transistor 100 to conduct current. The output of transistor 96 supplies current to resistor 98 to remove the bias current from transistor 100 and turn transistor 100 off. In one embodiment, transistor 100 is a PNP transistor configured as a voltage gain stage. Node 104 is connected to transistor 100 and resistors 106 and 108. The voltage at node 104 is pulled up to a voltage approximately equal to Vcc when transistor 100 is on. The output signal from transistor 100 is taken from the collector of transistor 100 at node 104. When transistor 100 is turned off, the voltage at node 104 is pulled low by resistor 106. This current signaling mode requires little movement of voltage at node 102; and therefore, speeds up operation of a signal input to at least one of terminal 14 and terminal 16. Faster operation of electric circuit 10 facilitates serial digital communication between a microcomputer (not shown) and an electrically erasable programmable read only memory (EEPROM)(not shown) connected to resistor 108.

In one embodiment, resistor 108 is connected to a microcomputer (not shown) and memory (not shown). In one embodiment, the memory is an electrically erasable programmable read only memory (EEPROM) (not shown). Resistor 108 allows the microcomputer to override the signal at node 104 and directly communicate with the EEPROM. The result is the ability to program the EEPROM with data affecting fan operation from terminal 14 or terminal 16 and for the microcomputer to read and correct data in the EEPROM. The EEPROM is programmed to control different modes of the fan based on combinations of inputs to terminals 12, 14 and 16.

In one embodiment diode 77, connected between input terminal 16 and node 76, is a zener diode. Zener diode 77 provides the half-wave rectification of the AC voltage input to terminal 16 which is distinguished from the fall-wave rectification of the AC voltage input to terminal 14. In one embodiment, diode 77 is a zener diode of minimal power rating, and voltage rating in excess of 24 VAC, and a breakdown voltage of 47 volts. Zener diode 77 protects itself from transient voltages, and electronic static discharge voltage on input line 16.

Figure 2:
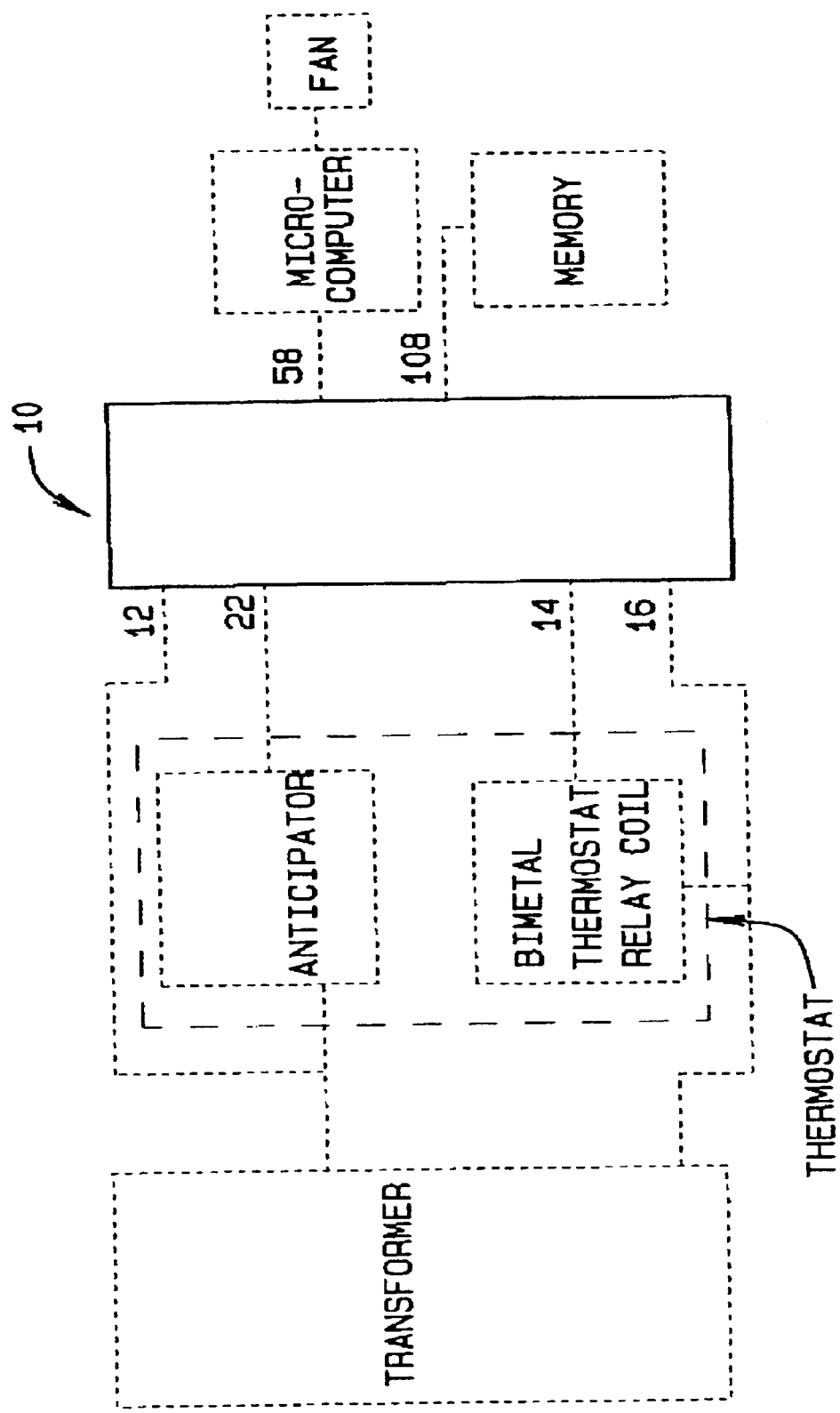
FIG. 2 is an exemplary system including the electric circuit shown in FIG. 1

FIG. 2 is an exemplary system including the electric circuit 10 shown in FIG. 1 including inputs 12, 14, 16, a return line 22, a first output 58, and a second output 108. Electric circuit 10 is electrically connected in parallel to a bimetal thermostat relay coil and a transformer. The transformer is electrically connected in series to an anticipator circuit located within a thermostat. First output 58 is electrically connected to a microcomputer. The microcomputer is configured to control fan speed. The microcomputer is electrically connected to a memory. Second output 108 is configured to connect to the memory.

While the invention has been described in terms of various specific embodiments, those skilled in the art will recognize that the invention can be practiced with modification within the spirit and scope of the claims.

What is claimed is:

1. A method for controlling fan speed using an electrical circuit, the electrical circuit including a plurality of inputs, a first output, a second output, and a return line, the circuit electrically connected to a thermostat relay coil and to a transformer, the transformer electrically connected to an anticipator located within the thermostat, the circuit including one input electrically connected to a zener diode and a plurality of rectifiers electrically coupled to a plurality of optically coupled isolators, the optically coupled isolators electrically connected to a shunt resistor and the first and second outputs, said method comprising the steps of:

sensing a temperature change;

supplying voltage to the electrical circuit through the relay coil; and controlling a fan speed based on the inputs to the electric circuit.

2. A method in accordance with claim 1 wherein the relay coil comprises a bimetal relay coil, said step of supplying voltage comprises the step of supplying voltage to the electrical circuit through the bimetal relay coil.

3. A method in accordance with claim 1 wherein the transformer is electrically connected in series to the anticipator.

4. A method in accordance with claim 1 wherein said step of sensing a temperature change further comprises the step of activating the anticipator by applying current to the anticipator.

5. A method in accordance with claim 1 wherein said step of supplying a voltage to the electrical circuit comprises the step of applying electric current to the anticipator to heat the relay coil.

6. A method in accordance with claim 1 wherein said step of supplying a voltage to the electrical circuit comprises the step of connecting the electrical circuit in parallel to the relay coil.

7. A method in accordance with claim 1 wherein a zener diode is electrically connected to one input line and to a rectifier, said step of supplying voltage to the electrical circuit comprises the step of limiting the conduction of current through the optically coupled isolator.

8. A method in accordance with claim 1 wherein said step of supplying a voltage to the electrical circuit further comprises the step of connecting at least one of the two inputs to a transformer.

9. A method in accordance with claim 1 wherein memory is electrically connected to the second output, said step of selecting a fan speed comprises the step of programming memory based on the inputs.

10. A method in accordance with claim 1 wherein said step of controlling a fan comprises the step of outputting an electrical signal from at least one optical coupled isolator to a microcomputer.

11. An apparatus in accordance with claim 1 wherein said first output configured to be electrically connected to a microcomputer.

12. An apparatus in accordance with claim 11 wherein said microcomputer configured to control fan speed.

13. An apparatus in accordance with claim 12 wherein said microcomputer configured to be electrically connected to memory to access a value for fan speed.

14. An apparatus in accordance with claim 12 wherein said microcomputer comprises at least one of a microprocessor, a microcontroller, a reduced instruction set computer and at least one application specific integrated circuit.

15. An apparatus comprising an electrical circuit comprising a plurality of inputs, a first output, a second output and a return line, said circuit connected in parallel to a thermostat relay coil and a transformer, the transformer electrically connected to an anticipator circuit located within the thermostat, said circuit comprising a plurality of rectifiers and a plurality of optically coupled isolators, said rectifiers electrically coupled to said plurality of optically coupled isolators, said optically coupled isolators electrically connected to said first and second output.

16. An apparatus in accordance with claim 11 wherein said second output configured to be electrically connected to memory.

17. An apparatus in accordance with claim 16 wherein said memory comprises at least one of a random access memory, an electrically erasable programmable read only memory, and a read only memory.

18. An apparatus in accordance with claim 11 wherein said second output configured to be electrically connected to a transistor.

19. An apparatus in accordance with claim 18 wherein said transistor comprises at least one of a NPN transistor and a PNP transistor configured as a voltage gain stage.

20. An apparatus in accordance with claim 19 wherein said voltage gain transistor configured to be electrically connected to an electrically erasable programmable read only memory (EEPROM).

21. An apparatus in accordance with claim 11 wherein the transformer electrically connected in series to said anticipator.

22. An apparatus in accordance with claim 11 wherein said anticipator configured to be electrically connected across a plurality of thermostat contacts.

23. An apparatus in accordance with claim 11 wherein said rectifiers comprise at least one of a full-wave bridge rectifier and a center-tapped full-wave rectifier.

24. An apparatus in accordance with claim 11 wherein said thermostat relay coil comprises a bimetal relay coil.

25. An apparatus in accordance with claim 11 wherein said circuit further comprises a voltage reference electrically connected to one of said optically coupled isolators.

26. An apparatus in accordance with claim 25 wherein said voltage reference comprises at least one of a diode, a zener diode, and a resistor divider network.

27. An apparatus in accordance with claim 11 wherein said circuit further comprises a plurality of zener diodes electrically connected to said rectifiers.

28. An apparatus in accordance with claim 27 wherein one of said zener diodes configured to be electrically connected in series to one of said rectifiers.

29. An apparatus in accordance with claim 28 wherein said one zener diode configured to produce a half-wave sinusoidal input signal to said rectifier.

30. An apparatus in accordance with claim 27 wherein said plurality of zener diodes configured to be oriented such that a first zener diode is in opposite orientation to said second zener diode.

31. An apparatus in accordance with claim 11 wherein one of said inputs configured to be electrically connected to a zener diode.

32. An apparatus in accordance with claim 11 wherein said optically coupled isolators configured to be electrically connected to a shunt resistor.

33. An apparatus in accordance with claim 11 wherein said optically coupled isolators configured to be electrically connected to a low voltage signal connection.

34. An apparatus in accordance with claim 11 wherein said return line configured to electrically connect to a plurality of resistors.

* * * * *

UNITED STATES PATENT AND TRADEMARK OFFICE
CERTIFICATE OF CORRECTION

PATENT NO.     : 6,357,667 B1
DATED          : March 19, 2002
INVENTOR(S)    : Young It is certified that error appears in the above-identified patent and that said Letters Patent is hereby corrected as shown below:

<u>Column 7,</u>
Lines 41 and 48, delete "11" and insert therefor -- 15 --.

<u>Column 8,</u>
Lines 8, 11, 14, 17, 19, 24, 37, 40, 43 and 46, delete "11" and insert therefor -- 15 --.

Signed and Sealed this

Ninth Day of September, 2003

JAMES E. ROGAN
*Director of the United States Patent and Trademark Office*